T. T. CHALONER.
ANTISKID ATTACHMENT FOR VEHICLE WHEELS.
APPLICATION FILED MAR. 31, 1909.
944,772.  Patented Dec. 28, 1909.
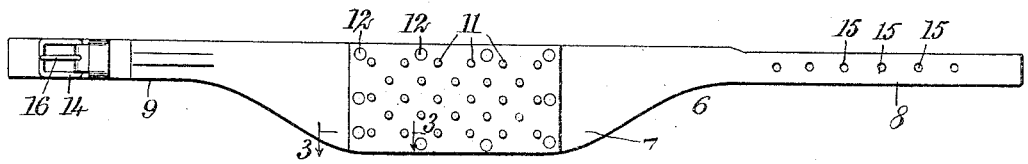
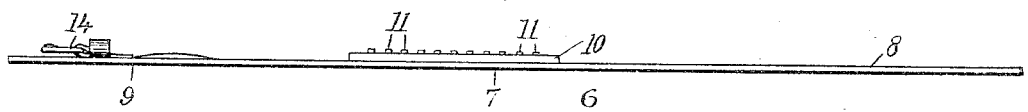
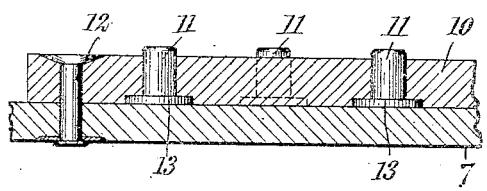
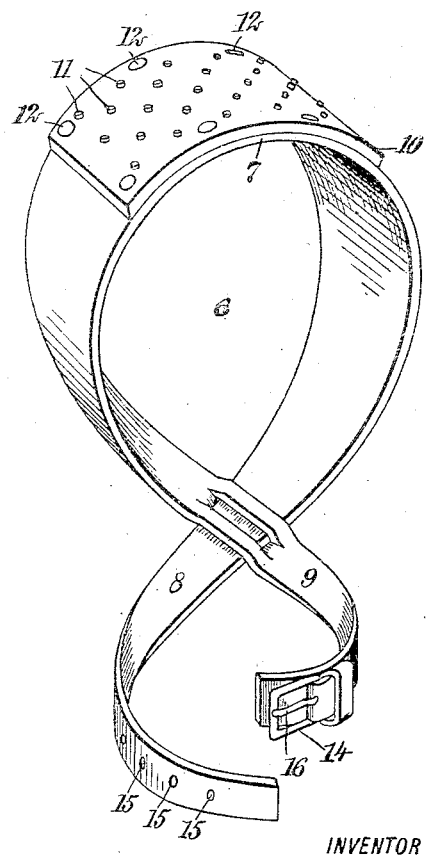
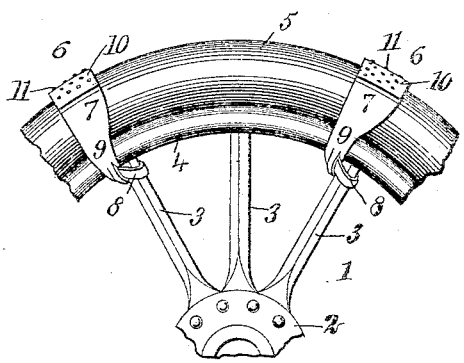
WITNESSES
INVENTOR
Thomas T. Chaloner
ATTORNEYS

UNITED STATES PATENT OFFICE.

THOMAS T. CHALONER, OF NEW YORK, N. Y.

ANTISKID ATTACHMENT FOR VEHICLE-WHEELS.

944,772. Specification of Letters Patent. Patented Dec. 28, 1909.

Application filed March 31, 1909. Serial No. 486,866.

*To all whom it may concern:*

Be it known that I, THOMAS T. CHALONER, a citizen of the United States, and a resident of the city of New York, borough of Manhattan, in the county and State of New York, have invented a new and Improved Antiskid Attachment for Vehicle-Wheels, of which the following is a full, clear, and exact description.

This invention relates to an anti-skid device to be placed over the tire of an automobile or the like and attached to the wheel thereof.

The object of the invention is to provide a device which is simple and efficient and easily constructed, and several of which are adapted to be attached at intervals to a wheel of an automobile or the like, to protect the tire and at the same time prevent the wheel from skidding. This and other objects will be more fully described hereinafter and particularly set forth in the claim.

Reference is to be had to the accompanying drawings forming a part of this specification, in which similar characters of reference indicate corresponding parts in all the views, and in which—

Figure 1 is a top plan view of my device, showing it in its extended position; Fig. 2 is a side view in elevation; Fig. 3 is a vertical section on the line 3—3 in Fig. 1; Fig. 4 is an enlarged perspective view; and Fig. 5 is a view in elevation, showing a plurality of my devices attached to an automobile wheel.

Heretofore it has been the custom to place chains over the tire of the wheel to prevent skidding. These chains cut up the roads and wear out the tires.

My invention is adapted to lie flat on the tire, and does not tear up the roads to an appreciable extent.

Referring to the separate parts of the invention, 1 indicates the wheel of an automobile or the like, which has a hub 2, radiating spokes 3, a rim 4 and a tire 5. Adapted to be placed over the tire 5 at intervals, and fastened to the spokes 3 are anti-skidding devices 6. The anti-skidding devices 6 consist of a strip of some suitable material, such as canvas, leather or the like, which has a main body portion 7, from which extend at opposite sides narrow strap portions 8 and 9.

The body portion 7 is considerably wider than the strap portion, and has secured in any suitable manner to the outer surface thereof a retaining strip 10, which is adapted to secure to the body portion 7 suitable road-engaging studs 11. The retaining strip 10 is adapted to be secured to the body portion 7 by any suitable means, such as stitching, or rivets 12, and has perforations therein, through which extend the studs 11. These studs 11 project slightly beyond the surface of the wearing strip 10 and have a circumferential flange 13 on their lower end, which is adapted to be engaged by the strip 10, to hold the studs to the body portion 7, the base of the studs resting snugly against the upper part of the body portion 7.

The strap portion 8 is adapted to fit through a pair of slits in the strap portion 9, as shown in Fig. 4, so as to be threaded between the loops formed by these slits, and is adapted to engage a buckle 14, and has a plurality of perforations 15 which are adapted to be engaged by a retaining pin 16 on the buckle 14. Any other suitable form of buckle may be used to secure the strap portion 8 to the strap portion 9.

As shown in Fig. 5, the device is laid over the outside of the tire, with the projecting studs at the outside and the strap portions extended around the rim 4 of the wheel and the strap portion 8 inserted in the slits in the strap portion 9 and then wrapped around the spoke 3, the strap portion 8 being secured to the strap portion 9 by means of the buckle 14. These devices are placed at suitable intervals on the wheel, and thus form a simple and efficient anti-skidding device, which will not cut up the tires nor destroy the roads.

Having thus described my invention, I claim as new and desire to secure by Letters Patent:—

An anti-skidding attachment, comprising a body portion, straps integral with said body portion extending from opposite sides thereof, studs for said body portion, means for securing said studs to said body portion, one of said straps being adapted to be threaded through the other of said straps, and means for securing said straps together.

In testimony whereof I have signed my name to this specification in the presence of two subscribing witnesses.

THOMAS T. CHALONER.

Witnesses:
 FREDERICK O'BYRNE,
 FREDERICK P. SIMPSON.